(No Model.)

A. NICOLAUS & W. J. DELMAR.
BOUQUET HOLDER.

No. 572,612. Patented Dec. 8, 1896.

WITNESSES
H. A. Lamb
Susan V. Hiley

INVENTORS
August Nicolaus and
William J. Delmar
By A. M. Wooster
Atty.

UNITED STATES PATENT OFFICE.

AUGUST NICOLAUS AND WILLIAM J. DELMAR, OF BRIDGEPORT, CONNECTICUT, ASSIGNORS OF ONE-THIRD TO ERNEST A. FEAZ, OF PLATTSVILLE, CONNECTICUT.

BOUQUET-HOLDER.

SPECIFICATION forming part of Letters Patent No. 572,612, dated December 8, 1896.

Application filed October 6, 1896. Serial No. 607,979. (No model.)

*To all whom it may concern:*

Be it known that we, AUGUST NICOLAUS and WILLIAM J. DELMAR, citizens of the United States, residing at Bridgeport, in the county of Fairfield and State of Connecticut, have invented certain new and useful Improvements in Bouquet-Holders; and we do hereby declare the following to be a full, clear, and exact description of the invention, such as will enable others skilled in the art to which it appertains to make and use the same.

Our invention has for its object to provide a neat, inconspicuous, and not unornamental device adapted for attachment to a lady's dress or the lapel of a coat for securely holding a flower or small bouquet, but in such a manner as to permit the flower or bouquet to be changed in an instant.

With these ends in view we have devised the novel bouquet-holder of which the following description, in connection with the accompanying drawings, is a specification, numerals being used to designate the several parts.

Figure 1:
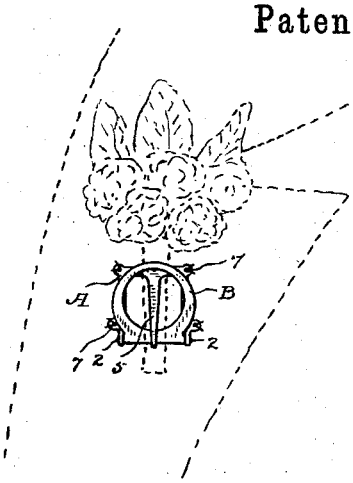
Figure 2:
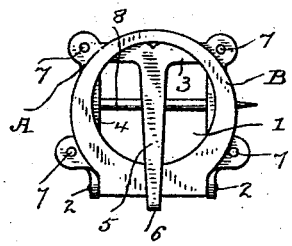
Figure 3:
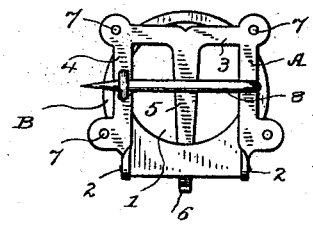
Figure 4:
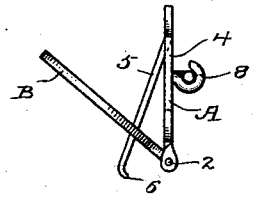

Figure 1 is an elevation illustrating our novel bouquet-holder in use, no pin being used and the device being attached to the lapel of a coat by stitches; Fig. 2, a view on an enlarged scale illustrating a form of our novel bouquet-holder adapted to be held in place by a pin; Fig. 3, a rear view corresponding with Fig. 2, and Fig. 4 is a side view illustrating the position of the parts when in position to receive a bouquet.

Our novel bouquet-holder consists, essentially, of a frame A and a holder B, pivoted in said frame. The special shape of the holder and frame is not of the essence of our invention. It is simply required that the holder be provided with an opening 1 to receive the stem of a flower or bouquet and that it be pivoted in any suitable manner in the frame. In the present instance we have shown the holder as provided with trunnions 2 and the frame as consisting of a cross-piece 3, two side pieces 4, formed integral therewith and provided with openings to receive the trunnions, and a spring-tongue 5, which is formed integral with the frame. In the assembled position the cross-piece is at the top and the upper portion of the holder lies outside of the cross-piece, the spring-tongue 5 entering opening 1 and the end thereof bearing firmly upon the holder below the opening, as clearly shown in the several figures of the drawings. The tongue is preferably made slightly longer than the holder and is provided with an inwardly-turned end 6, which acts as a stop to prevent the holder from being turned over backward and disengaged from the spring-tongue. The action of the spring-tongue is to draw the holder toward the closed position, as in Figs. 2 and 3, and retain it there. When the holder is placed in the position shown in Fig. 4, it is against the power of the spring, which will tend to throw the holder toward the closed position and will clamp the stem of a flower or bouquet and retain it securely in place, as indicated in Fig. 1. The frame may be held in place on a garment in any ordinary or preferred manner.

7 denotes holes in the frame through which stitches may pass to attach the frame to a garment, and 8 denotes a pin which may be provided, if preferred.

Having thus described our invention, we claim—

1. A bouquet-holder consisting essentially of a frame provided with a spring-tongue, a holder pivoted in said frame and provided with an opening to receive the stem of a flower or bouquet, said tongue bearing upon the holder below the opening and acting to move the holder toward the closed position.

2. A bouquet-holder comprising a frame consisting of side pieces and a cross-piece with a spring-tongue extending therefrom, and a holder having an opening to receive the stem of a flower or bouquet and pivoted in the frame opposite to the cross-piece, said tongue passing into the opening and bearing upon the holder below the opening whereby the holder is moved toward the closed position.

3. A bouquet-holder consisting essentially of a frame provided with a spring-tongue and with suitable means as a pin whereby it may be attached to a garment, and a holder pivoted in said frame, and provided with an opening to receive the stem of a flower or bouquet, said tongue bearing upon the holder below the opening as and for the purpose set forth.

In testimony whereof we affix our signatures in presence of two witnesses.

AUGUST NICOLAUS.
WILLIAM J. DELMAR.

Witnesses:
A. M. WOOSTER,
SUSAN V. HELEY.